(12) United States Patent
Bivens

(10) Patent No.: US 6,513,811 B1
(45) Date of Patent: Feb. 4, 2003

(54) AIR DAMPER WITH GRAPHITE COATED LIP SEAL

(75) Inventor: Steven L. Bivens, Kankakee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/626,270

(22) Filed: Jul. 25, 2000

Related U.S. Application Data

(63) Continuation-in-part of application No. 09/388,971, filed on Sep. 2, 1999.

(51) Int. Cl.[7] .................................................. F16J 15/32
(52) U.S. Cl. ..................... 277/549; 277/556; 277/569; 277/650; 277/944; 277/935; 188/322.18
(58) Field of Search ................................. 277/549, 556, 277/569, 596, 650, 908, 944, 945, 937, 938, 436; 188/322.16

(56) References Cited

U.S. PATENT DOCUMENTS

| | | | | |
|---|---|---|---|---|
| 3,612,545 A | * | 10/1971 | Storms | |
| 3,938,813 A | * | 2/1976 | Forch | |
| 3,961,829 A | * | 6/1976 | Bowen et al. | |
| 3,971,606 A | * | 7/1976 | Nakano et al. | |
| 4,055,503 A | * | 10/1977 | Anselment et al. | ......... 508/130 |
| 4,102,608 A | * | 7/1978 | Balkau et al. | |
| 4,323,244 A | * | 4/1982 | Freitag et al. | ........... 267/64.12 |
| 4,521,027 A | * | 6/1985 | Marshall | |
| 5,045,635 A | * | 9/1991 | Kaplo et al. | |
| 5,112,901 A | * | 5/1992 | Buchert et al. | |
| 5,209,502 A | * | 5/1993 | Savoia | |
| 5,415,791 A | * | 5/1995 | Chou et al. | |
| 5,639,098 A | * | 6/1997 | MacDonald | |
| 5,702,091 A | * | 12/1997 | Perrin et al. | ............. 267/64.12 |
| 5,730,263 A | * | 3/1998 | Grundei et al. | |
| 5,882,012 A | * | 3/1999 | Niwa et al. | |
| 5,884,734 A | * | 3/1999 | Hiramoto | ............... 188/322.18 |
| 5,886,066 A | * | 3/1999 | Forschirm | .................... 523/200 |
| 5,887,857 A | * | 3/1999 | Perrin | ...................... 267/64.12 |
| 6,120,036 A | * | 9/2000 | Kalsi et al. | |
| 6,199,673 B1 | * | 3/2001 | Wach | .................... 188/322.18 |

* cited by examiner

*Primary Examiner*—Anthony Knight
*Assistant Examiner*—Vishal Patel
(74) *Attorney, Agent, or Firm*—Pitney, Hardin, Kipp & Szuch LLP

(57) ABSTRACT

The air damper includes a piston reciprocating within a cylindrical housing. The piston includes a lip seal which is made of rubber or thermoplastic elastomer impregnated with a minimum of 3% molybdenum/seal part weight, or a minimum of 2% polytetrafluoroethylene or silicone/seal part weight or a minimum of 1% wax/seal part weight. The lip seal is coated with a minimum of 0.5%/seal part weight graphite powder/molybdenum disulfide. The housing is made with a minimum of 2% silicone impregnated thermoplastic or a minimum of 2% moly sulfide impregnated thermoplastic. This provides for increased smoothness of operation of the air damper, particularly at low speeds.

4 Claims, 1 Drawing Sheet

AIR DAMPER WITH GRAPHITE COATED LIP SEAL

This application is a continuation-in-part of U.S. patent application Ser. No. 09/388,971 filed on Sep. 2, 1999 entitled "Air Damper with Graphite Coated Lip Seal".

BACKGROUND OF THE INVENTION

1. Field of the Invention

This invention pertains to the use of powdered graphite on the lip seal of an air damper to cause the air damper to operate more smoothly.

2. Description of the Prior Art

In the prior art, an air damper of the type with a piston shaft and a lip seal reciprocating within a body or cylinder is well-known. However, a typical rubber seal may slide roughly, particularly at low speeds, resulting in a rough operation of the air damper. Many coatings may attract dust or plug the air orifice thereby impairing the function of the air damper. Moreover, the use of grease or silicone may cause the seal to stick in place and not open. Moreover, the viscosity of grease increases under cold conditions which slows down the damping rate.

An elastomeric coating for a lip seal is disclosed in U.S. Pat. No. 4,818,620 entitled "Elastomer Coated Lip Seal", issued on Apr. 4, 1989 to Pilkington, but does not adequately address the above deficiency.

Graphite powder for lubrication purposes is likewise old in the prior art, such as is disclosed in U.S. Pat. No. 5,702,769 entitled "Method for Coating a Substrate with a Sliding Abrasion-Resistant Layer Utilizing Graphite Lubricant Particles", issued on Dec. 30, 1997 to Peters but does not address the above deficiency with regard to smoothness of operation.

OBJECTS AND SUMMARY OF THE INVENTION

It is therefore an object of this invention to provide for increased smoothness of operation of an air damper, particularly at low speeds.

It is therefore a further object of this invention to achieve the above object without any impairment of the function of the air damper, such as attracting dust or plugging the air orifice.

It is therefore a further object of this invention to achieve the above objects without unduly increased manufacturing expenses or other deficiencies.

These and other objects are achieved by providing a rubber or thermoplastic elastomer lip seal coated with a minimum of 0.5%/seal part weight graphite powder/ molybdenum disulfide. Typically, the lip seal is made of rubber or thermoplastic elastomer impregnated with a minimum of 3% molybdenum/seal part weight, or a minimum of 2% TEFLON® (polytetrafluoroethylene) or silicone/seal part weight or a minimum of 1% wax/seal part weight. The housing is typically made with a minimum of 2% silicone impregnated thermoplastic or a minimum of 2% moly sulfide impregnated thermoplastic.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
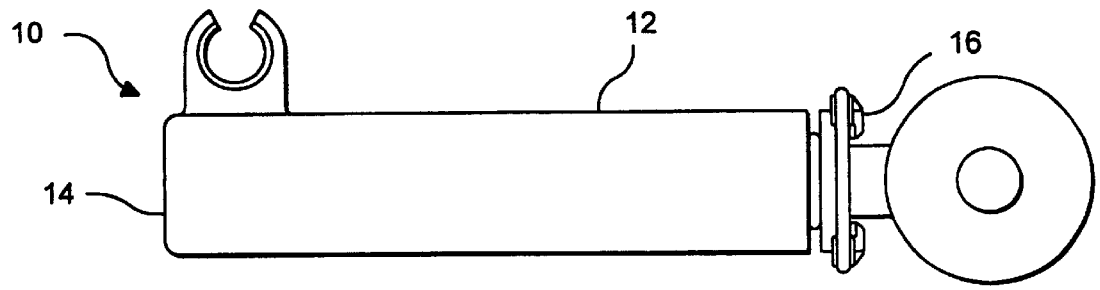
FIG. 1 is a plan view of an air damper which is adaptable to the present invention.

Referring to the drawings in detail wherein like numerals refer to like elements throughout the several views, one sees that FIG. 1 is a plan view of an air damper 10 which is adaptable to the present invention. This air damper 10 is disclosed in more detail in U.S. patent application Ser. No. 09/177,029, entitled "Silent Damper with Anti-Rattle Shaft", filed on Oct. 22, 1998, the disclosure of which is hereby incorporated by reference.

Figure 2:
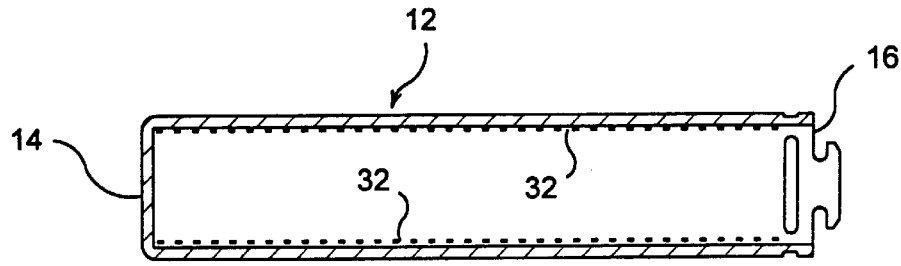
FIG. 2 is a cross-sectional view of the housing of the air damper which is adaptable to the present invention, illustrating the film of graphite powder spread within the interior of the housing by the movement of the piston.
Figure 3:
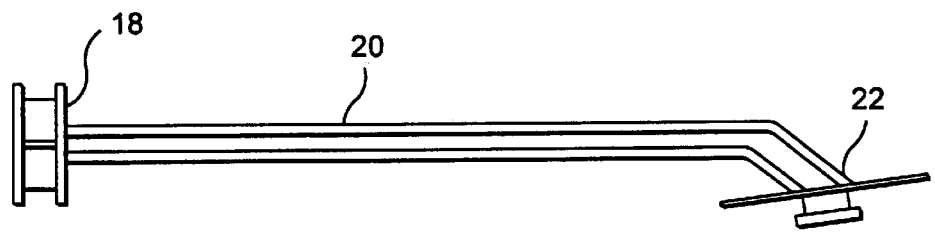
FIG. 3 is a plan view of the piston and shaft of an air damper which is adaptable to the present invention.
Figure 4:
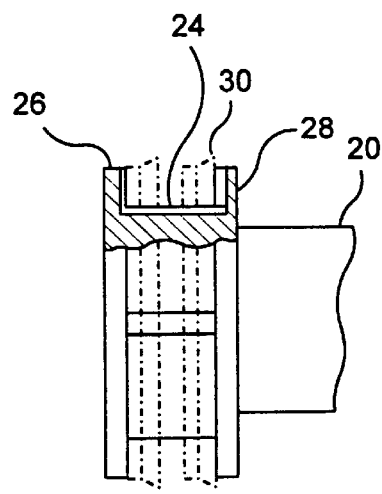
FIG. 4 is a plan view of the piston of an air damper which is adaptable to the present invention, with the two positions of the lip seal shown in phantom.

Air damper 10 typically comprises a cylindrical housing 12 with a closed end 14 and an open end 16 (see FIG. 2), along with a piston 18 attached to a shaft 20 with an attachment head 22 (see FIG. 3). Selective air communication groove 24 is formed between disks 26, 28 of piston 18 (see FIG. 4). The vertical portion (in the orientation shown in FIG. 4) of selective air communication groove 24 formed on disk 28 has substantially greater area than the vertical portion of selective air communication groove 24 formed on disk 26. Lip seal 30 urges radially outward against the interior of cylindrical housing 12 to form a relatively airtight seal. As piston 18 is extended or withdrawn from cylindrical housing 12, lip seal 30 urges against disk 26 thereby restricting the passage of air through selective air communication groove 24 thereby effecting damping. However, as piston 18 is retracted into housing 12, lip seal 30 urges against disk 28 thereby allowing increased passage of air through selective air communication groove 24 thereby diminishing damping. It is important to the operation of air damper 10 that selective air communication groove 24 not become plugged or blocked.

As evidenced by film 32 shown on the interior of housing 12 on FIG. 2, lip seal 30 is coated with a minimum of 0.5%/seal part weight graphite powder/molybdenum disulfide or equivalent. Moreover, typically, lip seal 30 is made of rubber or thermoplastic elastomer impregnated with a minimum of 3% molybdenum/seal part weight, or a minimum of 2% TEFLON® (polytetrafluoroethylene) or silicone/seal part weight or a minimum of 1% wax/seal part weight. Cylindrical housing 12 is typically made with a minimum of 2% silicone impregnated thermoplastic or a minimum of 2% moly sulfide impregnated thermoplastic.

This graphite powder as evidenced by film 32 allows for smoother operation of piston 18 within housing 12 without the risk of attracting dust or plugging selective air communication groove 24.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An air damper comprising:

a cylindrical body having a first end, a second end, and an interior extending therebetween;

a reciprocating piston within said cylindrical body;

a lip seal operatively positioned between said interior of said cylindrical body and said reciprocating piston to form a relatively airtight seal;

a coating of graphite powder or molybdenum disulfide on said lip seal so as to increase smoothness of operation of said reciprocating lip seal; and an air communication passage which is selectively restricted as said piston reciprocates so as to effect damping;

wherein said lip seal includes rubber or thermoplastic elastomer impregnated with a minimum of 1% wax seal part weight, and wherein said cylindrical body includes thermoplastic impregnated with a minimum of 2% moly sulfide impregnated thermoplastic.

2. The air damper of claim 1 wherein said reciprocating piston includes said lip seal.

3. The air damper of claim 2 wherein said piston includes a pair of disks, wherein said air communication passage extends between said disks, and wherein said lip seal is positioned between said disks, such that as said piston is withdrawn from said cylindrical body, said lip seal urges against one of said disks to selectively restrict said air communication passage, and such that as said piston is retracted into said cylindrical body, said lip seal urges against the other one of said disks to selectively restrict said air communication passage.

4. The air damper of claim 3 wherein said piston includes a second lip seal between said disks.

* * * * *